(12) United States Patent
Wolf et al.

(10) Patent No.: US 6,983,959 B2
(45) Date of Patent: Jan. 10, 2006

(54) COUPLING FOR CONNECTING HYDRAULIC DUCTS

(75) Inventors: Diethard Wolf, Lohmar (DE); Jörg Altenrath, Lohmar (DE); Recep Macit, Düsseldorf (DE)

(73) Assignees: Walterscheid Rohrverbindungstechnik GmbH (DE); Still GmbH (DE)

( * ) Notice: Subject to any disclaimer, the term of this patent is extended or adjusted under 35 U.S.C. 154(b) by 80 days.

(21) Appl. No.: 10/368,224

(22) Filed: Feb. 17, 2003

(65) Prior Publication Data

US 2003/0155766 A1 Aug. 21, 2003

(30) Foreign Application Priority Data

Feb. 18, 2002 (DE) ......................... 102 06 853
Jan. 14, 2003 (DE) ......................... 103 01 127

(51) Int. Cl.
*F16L 37/18* (2006.01)

(52) U.S. Cl. ...................... 285/314; 285/319
(58) Field of Classification Search ................. 285/308, 285/313, 314, 315, 316, 319
See application file for complete search history.

(56) References Cited

U.S. PATENT DOCUMENTS

| | | | |
|---|---|---|---|
| 3,628,812 A | * 12/1971 | Larralde et al. ............. 285/315 |
| 4,573,713 A | * 3/1986 | Kipp et al. .................. 285/319 |
| 4,691,943 A | * 9/1987 | DeLand et al. ............. 285/315 |
| 4,781,400 A | * 11/1988 | Cunningham ............... 285/319 |
| 4,979,765 A | * 12/1990 | Bartholomew ............... 285/319 |
| 5,069,424 A | * 12/1991 | Dennany et al. ............. 285/319 |
| 5,161,834 A | * 11/1992 | Norkey ....................... 285/319 |
| 5,195,905 A |   3/1993 | Pesci |
| 5,228,728 A | * 7/1993 | McNaughton et al. ...... 285/319 |
| 5,248,168 A | * 9/1993 | Chichester et al. .......... 285/319 |

FOREIGN PATENT DOCUMENTS

| | | |
|---|---|---|
| CH | 684956 A5 | 2/1995 |
| DE | 26 27 397 | 12/1977 |
| DE | 199 32 307 A1 | 1/2001 |
| EP | 0 140 995 | 5/1985 |
| EP | 0 459 016 B1 | 12/1991 |
| EP | 0 466 218 A1 | 1/1992 |
| GB | 1167076 | 10/1969 |
| GB | 2199102 A | 6/1988 |
| JP | 50-27926 | 8/1975 |
| JP | 04-039492 | 2/1992 |
| WO | WO 96/35906 | 11/1996 |

* cited by examiner

*Primary Examiner*—David Bochna
(74) *Attorney, Agent, or Firm*—Harness, Dickey & Pierce, P.L.C.

(57) ABSTRACT

A coupling for connecting hydraulic ducts has a female coupling (1) with a receptacle and a first locking face arranged around a longitudinal axis. A male coupling (2) forms a second locking face, arranged around the longitudinal axis. The male coupling (2) can be inserted in the direction of the longitudinal axis (4) through an opening into the receptacle (3). A holding element (9) has a ring (10) with several spring elements projecting from the ring (10). The spring elements (11) extend parallel to the longitudinal axis (4). Locking elements (12) are formed on the free ends of the spring elements (11). The spring elements (11) are, respectively, elastically deformable against a spring force radially out of a locking position into a releasing position. In the inserted condition of the male coupling (2), the first locking face (15) and the second locking (16) face one another. Also, the locking elements (12) are supported in the locking position of the spring elements (11) on the first locking face (15) and on the second locking face (16).

26 Claims, 14 Drawing Sheets

COUPLING FOR CONNECTING HYDRAULIC DUCTS

CROSS-REFERENCE TO RELATED APPLICATIONS

This application claims priority to German Patent Application Nos. 10206853.4 filed Feb. 18, 2002, and 10301127.7 filed Jan. 14, 2003 which applications are herein expressly incorporated by reference.

FIELD OF THE INVENTION

The present invention relates to a coupling for connecting hydraulic ducts.

BACKGROUND OF THE INVENTION

WO 9635906 A1 describes a coupling for hydraulic ducts with a female coupling and a male coupling. The female coupling has a receptacle which receives the male coupling through an opening of the receptacle. The opening includes an inner circumferential groove which receives a multitude of locking elements. The locking elements, in form of annular segments supporting one another, are distributedly arranged around the circumference of the inner circumferential groove. The locking elements are springingly acted upon by an elastic O-ring towards the inside at the end of the inner circumferential groove distanced from the opening. The locking elements, together in a locking position, form a conical inner circumferential face and project partially from the inner circumferential groove to the inside.

The male coupling has a displacement face at its end insertable into the female coupling. The displacement face interacts with the inner faces of the locking elements such that the locking elements are moved from the locking position outwardly into the releasing position. In this position, the locking elements are completely arranged within the inner circumferential groove to receive the male coupling. The male coupling, further, has an outer circumferential groove. The locking elements are pressed into the outer groove by the elastic O-ring, as soon as the male coupling is inserted far enough into the receptacle. In this position of the male coupling, the locking elements are axially supported on the support face of the inner circumferential groove as well as on a locking face of the outer circumferential groove. Thus, the male coupling is retained against withdrawal.

A plastic ring is provided within the outer circumferential groove of the male coupling. The plastic ring is narrower than the outer circumferential groove. If the male coupling is inserted further into the receptacle, the locking elements slide on the outer circumferential face of the plastic ring. Thus, the locking elements are moved into the releasing position. The friction force between the locking elements and the plastic ring is higher than the friction force between the plastic ring and the male coupling. Thus when withdrawing the male coupling connector, the plastic ring slides within the outer circumferential groove till it abuts the locking face of the outer circumferential groove. The outer diameter of the plastic ring is at least as large as the outer diameter of the male coupling at its end. Accordingly, when further pulling out the male coupling, the locking elements slide from the plastic ring onto the outer circumferential face of the male coupling and the male coupling can be completely pulled out of the female coupling.

A disadvantage in this coupling is that when a locking element is loosened, the residual locking elements are not held in the inner circumferential groove since they cannot support each other. Furthermore, a high number of components is necessary making the assembly cumbersome. Furthermore, the plastic ring is loaded by a high mechanical loading. Thus, the outer diameter of the plastic ring may be reduced or worn off so that the ring becomes smaller than the outer diameter of the male coupling. This causes a jamming of the male coupling during withdrawal.

DE 199 32 307 A1 discloses a coupling with a female coupling having a receptacle. A male coupling is inserted through an opening of the receptacle. A circlip sits in an inner circumferential face of the receptacle. The circlip projects with a portion of its cross-sectional face radially to the inside. The male coupling has a displacement face on its end. The displacement face pushes the circlip radially deeper into the inner circumferential groove during the insertion of the male coupling into the receptacle. Thus, the male coupling can be received in the female coupling. The male coupling has an outer circumferential groove, into which the circlip, after further insertion of the male coupling, enters. In this position, the circlip is axially supported on the locking face of the outer circumferential groove as well as on the locking face of the inner circumferential groove. Thus, the male coupling is retained against withdrawal.

An annular gap is formed between the female coupling and the male coupling starting from the opening of the receptacle. An unlocking sleeve is inserted into the gap from the outside into the receptacle. Due to axial displacement of the unlocking sleeve into the receptacle, the circlip is axially moved along the conical locking face of the outer circumferential groove. This widens and radially pushes the circlip out of the outer circumferential groove so that the male coupling can again be removed from the receptacle.

The locking face of the outer circumferential groove is formed as steep as possible towards the longitudinal axis. Thus, the angle which the conical locking face encloses is as large as possible. This ensures the best possible axial support of the circlip between the locking face of the outer circumferential groove and the locking face of the inner circumferential groove. Accordingly, a high force has to be applied to push the circlip out of the outer circumferential groove. Furthermore, there is a danger that the circlip may widened irregularly and thus not widened round because it is cut at one position. Thus, the ends of the circlip can lock between the locking faces.

DE 26 27 397 A1 describes a coupling having a male coupling and a female coupling. A holding element has a ring, which forms a collar extending radially inside towards the longitudinal axis. Radially extending spring elements are formed on the ring. The spring elements are radially elastically formed. The collar of the ring rests in a circumferential groove of the male coupling. This fixes the holding element on the male coupling. The ring is cut at one position, to enable an assembly.

A groove is provided at the free ends of the spring elements. A collar extending radially towards the longitudinal axis engages the grooves when the male coupling is inserted into the female coupling. Therefore, the male coupling is securely held in the female coupling. Thus, during loading in a withdrawal direction, the spring elements are tensioned and retain the male coupling. An unlocking sleeve is arranged around the holding element. The unlocking sleeve slides during the displacement towards the female coupling in the insertion direction of the male coupling into the female coupling. The unlocking sleeve pushes against abutment faces of the spring elements pushing them radially to the inside until the collar of the female coupling does not rest in the groove of the spring elements. This enables withdrawal of the male coupling.

A disadvantageous is that the spring elements in the connected condition of the coupling, are tensioned and are correspondingly massively formed. Because of this, a large annular gap is necessary between the male coupling and the female coupling to enable passage of the spring elements. Furthermore, when releasing the coupling, the unlocking sleeve has to be moved against the withdrawal direction of the male coupling, so that a single-handed operation is not possible.

SUMMARY OF THE INVENTION

An object of the present invention is to provide a coupling to connect hydraulic ducts which has few components and is easily pre-assembled.

The invention provides a coupling for connecting hydraulic ducts which has a first coupling element in the form of a female coupling. The female coupling has a receptacle and forms a first locking face arranged around a longitudinal axis of the coupling. A second coupling element is in the form of a male coupling. The male coupling forms a second locking face arranged around the longitudinal axis. The male coupling is insertable in the direction of the longitudinal axis through an opening into the receptacle of the first coupling element. A holding element has a ring with several spring elements formed onto the ring. The spring elements extend parallel to the longitudinal axis. Locking elements are formed onto the free ends of the spring elements. The spring elements are, respectively, elastically deformable against a spring force radially outward from a locking position into a releasing position. In the connected condition of the coupling elements, the first locking face and the second locking face face each other. The locking elements are supported in the locking position of the spring elements on the one side on the first locking face and on the other side on the second locking face.

The holding element has one ring with several connected spring elements. This ensures that no locking element can get lost. Furthermore, the coupling is constructed of a small number of components and can be quickly and easily assembled.

The first coupling element, in the form of a female coupling, is a separate component which can be connected to a hydraulic duct or a hydraulic hose. The first coupling element can, however, also be formed as an integral component of a valve block formed integrally therewith.

In a first embodiment of the invention, the holding element rests in an annular recess of the receptacle of the first coupling element. The second coupling element forms a first displacement face arranged around the longitudinal axis. During insertion of the second coupling element into the receptacle, the first displacement face interacts, respectively, with one abutment face of the locking elements. Thus, the spring elements are moved from the locking position into the releasing position. Preferably, the second coupling element has a shoulder that forms the second locking face as well as the first displacement face.

In its inserted condition, starting from the opening of the first coupling element, an annular gap is formed between the first coupling element and the second coupling element. An unlocking sleeve passes into the annular gap and projects from the receptacle. The unlocking sleeve is axially displaceable on the second coupling element between a locking position and a releasing position. Furthermore, the unlocking sleeve has a second displacement face that interacts, respectively, with the abutment faces of the locking elements. Accordingly, as the unlocking sleeve moves from the locking position into the releasing position it moves the spring elements into their releasing position.

The unlocking sleeve, in the releasing position, is supported on the second locking face. The outer diameter of the unlocking sleeve is at least as large as the outer diameter of the shoulder in the transition between the unlocking sleeve and the shoulder.

The path along which the unlocking sleeve is axially displaceable can be limited. Here the unlocking sleeve, in the locking position, is supported axially on a shoulder of the second coupling element or on a circlip. The circlip rests in a circumferential groove of the second coupling element. The unlocking sleeve has an engaging mechanism to enable the unlocking sleeve to be moved by a tool such as a screw driver or a specially adapted lever. An elastically deformable O-ring rest in the annular recess to support the elastic effect of the spring elements. The elastically deformable O-ring acts upon the spring elements to take up their locking position.

The locking faces can be arranged differently to each other. A first possibility is, that the first locking face and the second locking face extend parallel to each other. In this arrangement of the locking faces, the locking elements, without having to move the coupling elements axially towards each other, can be moved from the locking position into the releasing position. Therefore, the coupling can also be released under hydraulic pressure.

To prevent the releasing and the opening of the coupling under pressure, a second possible arrangement of the locking elements towards each other can be provided. Here, the first locking face is conically formed and opens facing away from the opening. The second locking face is arranged on a plane arranged perpendicular to the longitudinal axis. Thus, the distance of the locking faces towards each other is reduced in the direction to the second position of the locking elements. Accordingly, the locking elements can only be moved from the locking position into the releasing position when the second coupling element is further inserted into the receptacle of the first coupling element. This can only be achieved when inner pressure is not present.

The same effect can be achieved in a third possible arrangement of the locking faces towards each other. Here, the first locking face is conically formed and opens facing away from the opening. The second locking face is also formed conical. The angle enclosed by the second locking face opens facing away from the opening. The angle enclosed by the second locking face is larger than the angle which is enclosed by the first locking face.

Preferably, in a non-parallel arrangement of the locking faces towards each other, starting from the opening of the first coupling element, an annular gap is formed between the first coupling element and the second coupling element in the inserted condition. The spring elements pass through the annular gap with their free ends projecting into the receptacle. The spring elements may have an engaging mechanism for a tool so that they can be moved from the locking position into the releasing position.

In a second embodiment of the invention, the holding element is arranged around the second coupling element. The first coupling element has an inner circumferential groove forming the first locking face. The first coupling element, in the area of the opening of the receptacle, forms a first displacement face arranged around the longitudinal axis. When the second coupling element is inserted into the receptacle, the first displacement face interacts, respectively, with an abutment face of the locking elements. Accordingly, the spring elements move from the locking position into the releasing position.

Further, an elastically deformable O-ring can be arranged between the spring elements of the holding element and an outer circumferential face of the second coupling element. The O-ring acts upon the spring elements to take up their locking position. Also, the O-ring supports the elastic effect of the spring elements.

Preferably starting from the opening of the first coupling element, an annular gap is formed between the first coupling element and the second coupling element in the inserted condition. The spring elements passes through the gap and projects with their free ends into the receptacle. The spring elements can have an engaging mechanism for a tool to move the spring elements from their locking position into the releasing position.

Also in the second embodiment, the locking faces can be arranged differently towards each other. In a first possibility, the first locking face and the second locking face extend parallel to each other. In this layout of the locking faces towards each other, the locking elements, without having to move the coupling elements towards each other, can be moved from the locking position into the releasing position. Therefore, when an inner pressure is present, the coupling can also be released.

To prevent the releasing and the opening of the coupling when an inner pressure is present, a second possible arrangement of the locking faces towards each other can be provided. Here the first locking face is arranged on a plane arranged perpendicular to the longitudinal axis. The second locking face is conically formed and opens facing away from the opening. Thus, the distance of the locking faces towards each other is reduced in the direction towards the second position of the locking elements. Accordingly, the locking elements can only be moved from the locking position into the releasing position when the second coupling element is further moved into the receptacle of the first coupling element. This, however, can only be achieved, when inner pressure is not present.

The same effect can also be achieved in a third possible arrangement of the locking faces towards each other. In this case, the second locking face is conically formed and opens facing away from the opening. Also, the first locking face is conically formed. The angle enclosed by the second locking face opens facing away from the opening and is larger than the angle enclosed by the first locking face.

Preferably, in a non-parallel arrangement of the locking faces towards each other, the holding element is held axially displaceable on the second coupling element. The second coupling element, in the connected condition of the coupling elements, is axially displaceable together with the holding element between a first and second position. In the first position, the locking elements of the holding element abut the second locking face. In the second position, the ring of the holding element is axially movable to abut an abutment face. In this case, the abutment face can be formed by a retaining ring resting in a circumferential groove of the second coupling element.

To move the spring elements from their locking position into their releasing position, in an inserted condition starting from the opening of the first coupling element, an annular gap is formed between the holding element and the second coupling element. An unlocking sleeve passes through the annular gap and projects from the receptacle. Furthermore, the unlocking sleeve is axially displaceable on the second coupling element between a locking position and a releasing position. The unlocking sleeve has a second displacement face, interacting, respectively, with the second abutment faces of the locking elements. Accordingly, moving the unlocking sleeve from the locking position into the releasing position moves the spring elements into their releasing position.

In a further embodiment, an unlocking sleeve is axially displaceably arranged on the second coupling element. The unlocking sleeve is movable by relative movement to the second coupling element against the insertion direction of the second coupling element into the receptacle from a locking position into a releasing position. The unlocking sleeve has a second displacement face, respectively, interacting with second abutment faces of the locking elements. Accordingly, moving the unlocking sleeve from the locking position into the releasing position moves the spring elements into their releasing position. Therefore, by displacing the unlocking sleeve against the insertion direction, withdrawal direction of the male coupling, initially the holding element is released and then the male coupling can be withdrawn from the receptacle. The second abutment faces are arranged in an axial direction against the insertion direction with increasing distance towards the longitudinal axis.

To form the annular gap between the first coupling element and the second coupling element as small as possible, the abutment faces, in the inserted condition of the second coupling element, are arranged outside of the receptacle.

The second coupling element has preferably a first shoulder, forming the second locking face. In this case, the holding element can be supported in an axial direction on the second locking face and on an abutment face of the second coupling element. The abutment face can, in this case, be formed by a second shoulder.

The inner diameter of the ring is larger than the maximum outer diameter of the second coupling element between the abutment face and an end face to ensure an easy assembly of the holding element. The end face is arranged on the free end of the second coupling element. This is the end to be inserted into the receptacle. Further, the unlocking sleeve has an inner diameter which is outside the area of the second displacement face, larger than the outer diameter of the ring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
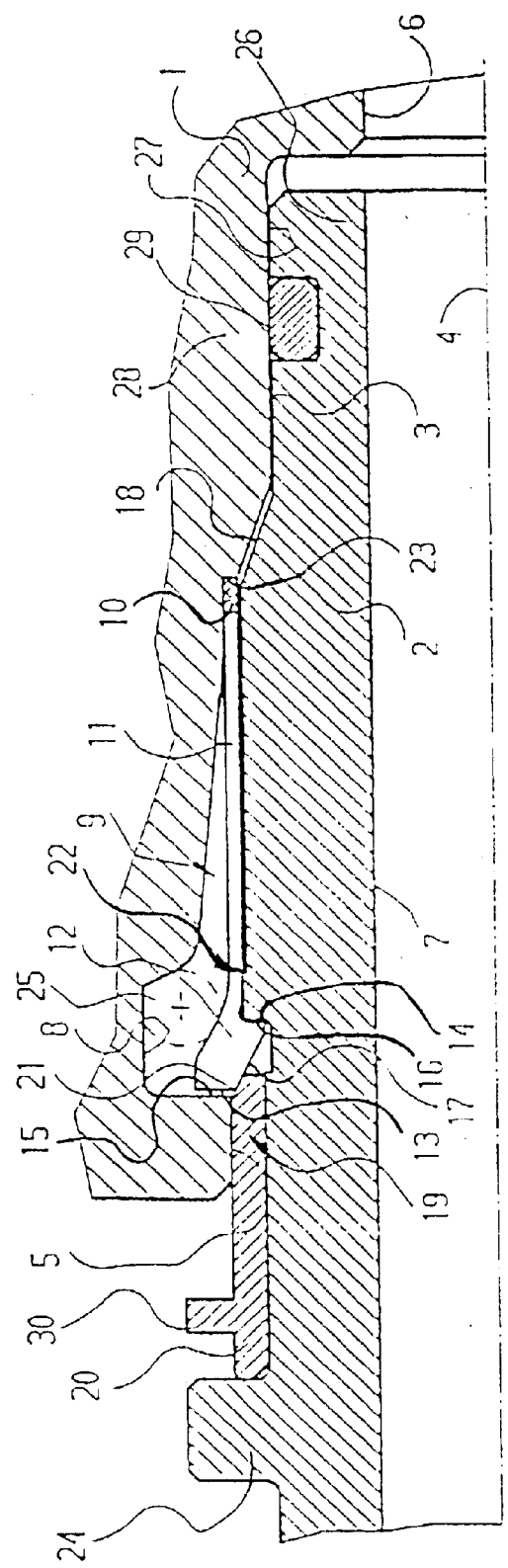
FIG. 1 is a longitudinal sectional view of a coupling according to the invention with a holding element resting in an annular recess of the first coupling element and the spring elements in a locking position.

FIG. 1 shows a coupling for connecting hydraulic ducts according to the invention. A first coupling element 1 is in the form of a female coupling and a second coupling element 2 is in the form of a male coupling. The first coupling element 1 has a receptacle 3. The second coupling element 2 is inserted into the receptacle in the direction of a longitudinal axis 4 through an opening 5. The first coupling element 1 has a first axial bore 6 and the second coupling element 2 has a second axial bore 7. The axial bores 6 and 7, respectively, are connected to hydraulic ducts.

An annular recess 8 is provided in the receptacle 3 of the first coupling element 1. A holding element 9 rests in the annular recess 8. The holding element 9 has a ring 10 coaxially arranged on the longitudinal axis 4. Axially extending spring elements 11 are formed on the ring 10. Locking elements 12 are formed on the free ends of the spring elements 11. The holding element 9 is received in the annular recess 8. The free ends of the spring elements 11 face the opening 5.

The locking elements 12 have a first abutment face 13 facing the opening 5 and a second abutment face 14 facing away from the first abutment face 13. The first abutment face 13 and the second abutment face 14 are arranged parallel to each other and perpendicular to the longitudinal axis 4. In the locking position shown in FIG. 1, the first abutment face 13 is supported on a first locking face 15. The locking face 15 is formed by the annular recess 8. The locking face 15 extends parallel to the first abutment face 13. The second abutment face 14 is supported on a second locking face 16. The second locking face 16 is formed by a first shoulder 22 of the second coupling element 2. The second locking face 16 extends parallel to the second abutment face 14. The second coupling element 2 is secured against withdrawal from the receptacle 3, by axial forces transmitted from the first shoulder 22 of the second coupling element 2 via the locking element 12 onto the first locking face 15 of the first coupling element 1.

This position of the coupling is achieved by the second coupling element 2 inserting into the receptacle 3 of the first coupling element 1. To accomplish insertion, an abutment face 17 of each locking element 12 slides on a first conical displacement face 18 of the second coupling element 2 formed by the shoulder 22. The locking elements 12 are moved from their locking position into their releasing position. As soon as the second coupling element 2 is moved far enough into the receptacle 3, the locking elements 12 pass the first shoulder 22. Thus, the locking elements 12 are moved due to the spring force of the spring elements 11 back into their first position. The second abutment face 14 of the locking elements 12 come into contact with the second locking face 16.

To release the coupling, an annular gap 19 is formed between the opening 5 of the first coupling element 1 and the second coupling element 2. An unlocking sleeve 20 is inserted from the outside into the gap 19 and into the receptacle. The unlocking sleeve 20 is coaxially arranged along the longitudinal axis and is axially displaceably held on the second coupling element 2.

Figure 2:
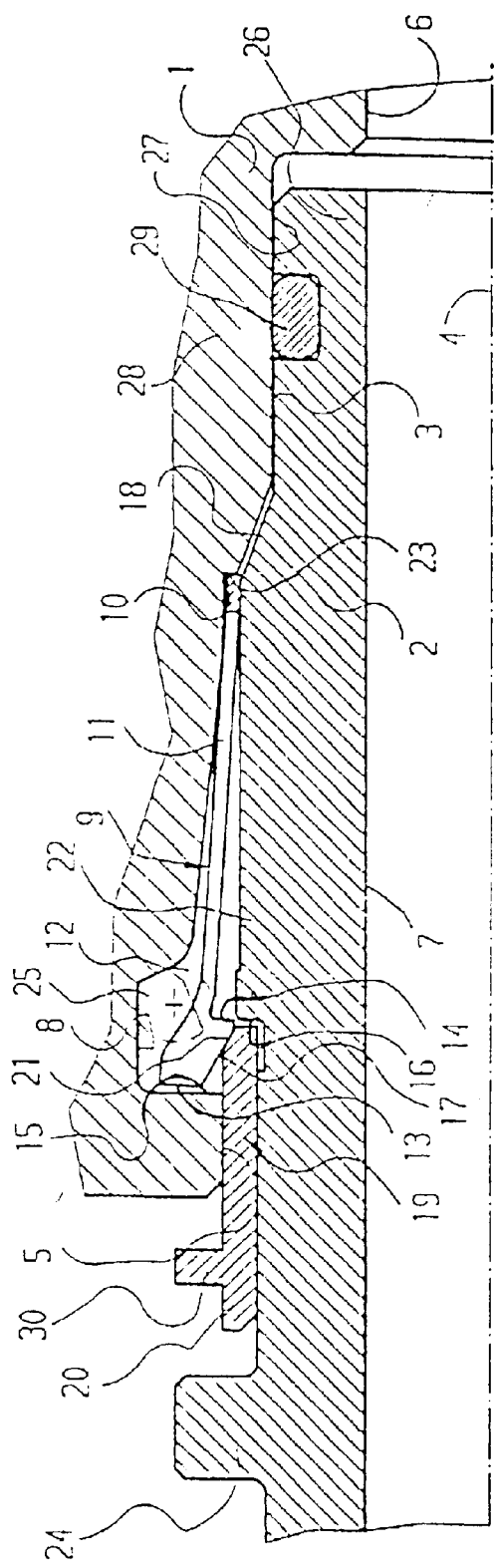
FIG. 2 is a longitudinal sectional view of the coupling of FIG. 1 with the spring elements in a second position.

The unlocking sleeve 20 has a second displacement face 21. Displacement face 21 interacts with the abutment faces 17 of the locking elements 12. Accordingly, when the unlocking sleeve 20 is inserted into the receptacle 3, the locking elements 12 slide on the second displacement face 21. The locking elements are then moved from their locking position into the releasing position. This position is represented in FIG. 2. During axial displacement of the unlocking sleeve 20, axial forces are also transmitted onto the holding element 9.

The holding element 9 is supported on a support face 23 of the annular recess 8. In this case, the abutment face 17 forms a small angle towards the longitudinal axis 4. Thus, the axial forces are as small as possible and the radial forces are as large as possible. The force, to be applied to displace the unlocking sleeve 20, is, therefore, small. Furthermore, the axial displacement path of the unlocking sleeve 20 out of the receptacle 3 is limited by a shoulder 24 of the second coupling element 2. A tool engaging mechanism for axial displacement of the unlocking sleeve 20 is presented as a flange portion 30.

An elastically deformable O-ring 25, indicated in FIGS. 1 and 2 by a dashed line, can be provided in the annular recess 8 to support the elastic effect of the spring elements 11. The O-ring 25 is supported on the base of the annular recess 8 and on the spring elements 11 of the holding element 9.

A cylindrical centering portion 26 centers the second coupling element 2 within the receptacle. The centering portion 26 is insertable into a corresponding centering bore 27 of the receptacle 3. A circumferential groove 28 is provided in the centering portion 26. A sealing ring 29 rests in the groove 28 and abuts, in a sealing manner, the inner face of the centering bore 27.

Figure 3:
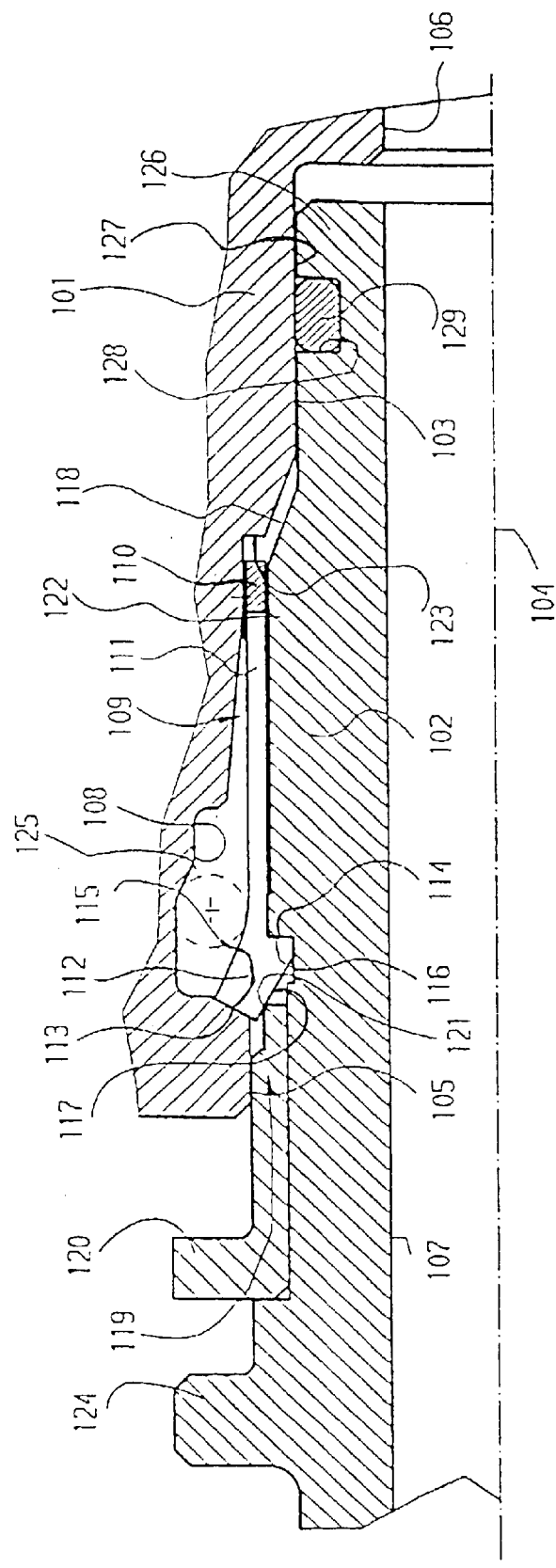
FIG. 3 is a longitudinal sectional view of a coupling with locking faces non-parallel arranged to each other and the spring elements are in a locking position.
Figure 4:
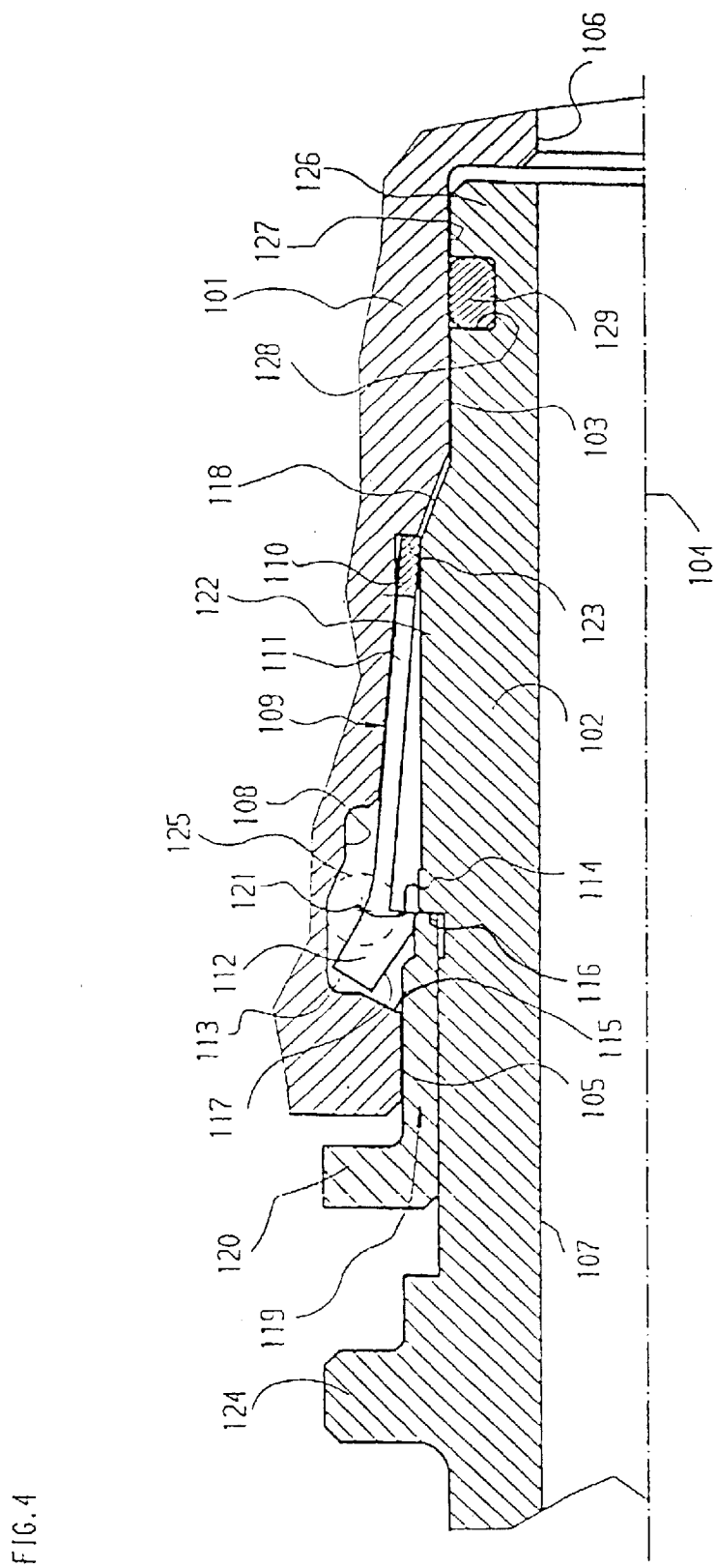
FIG. 4 is a longitudinal sectional view of a coupling of FIG. 4 with the spring elements in a second position.

FIGS. 3 and 4 show a coupling, corresponding mainly to the coupling according to FIGS. 1 and 2. Corresponding components or components with the same effect are provided with reference numerals, increased by the amount 100, and are described in connection with FIGS. 1 and 2.

The difference between the coupling according to FIGS. 3 and 4 and the coupling of FIGS. 1 and 2 is that the first abutment face 113 is angled with respect to the second abutment face 114. Also, the first locking face 115 is angled with respect to the second locking 116. The first abutment face 113 and the first locking face 115 are conical. The angles, which they enclose, open away from the opening 105.

The second abutment face 114 and the second locking face 116 are arranged perpendicular to the longitudinal axis 104. Therefore, the distance between the first abutment face 113 and the second abutment face 114 and the distance between the first locking face 115 and the second locking face 116 diminishes radially from the inside towards the outside. This means, that when the unlocking sleeve 120 is moved into the receptacle 103 to unlock the coupling, the second coupling element 102 together with the holding element 109 are initially axially displaced further into the receptacle 103. This displaces the spring elements 111 together with the locking elements 112 from their locking position into their releasing position. This means that the second coupling element 102 can only be moved deeper into the receptacle 103, when hydraulic inner pressure is not present in the axial bores 106, 107. Therefore, this ensures that the coupling can only be released when inner pressure is not present.

Figure 5:
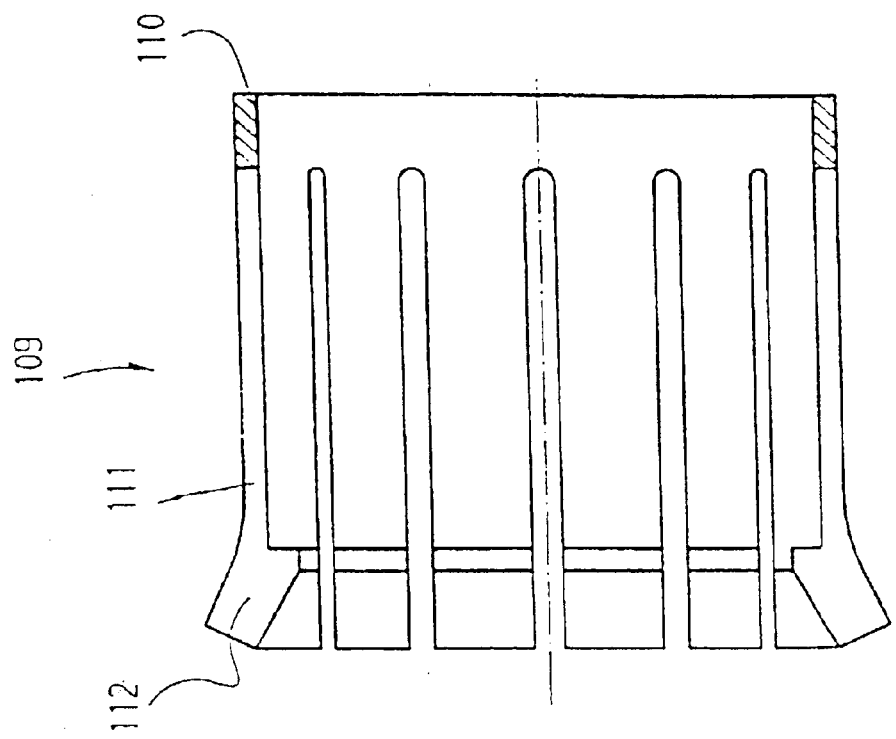
FIG. 5 is a longitudinal sectional view of a holding element of FIG. 3.

FIG. 5 shows the holding element 109 in a longitudinal sectional view and is described in connection with FIGS. 3 and 4.

Figure 6:
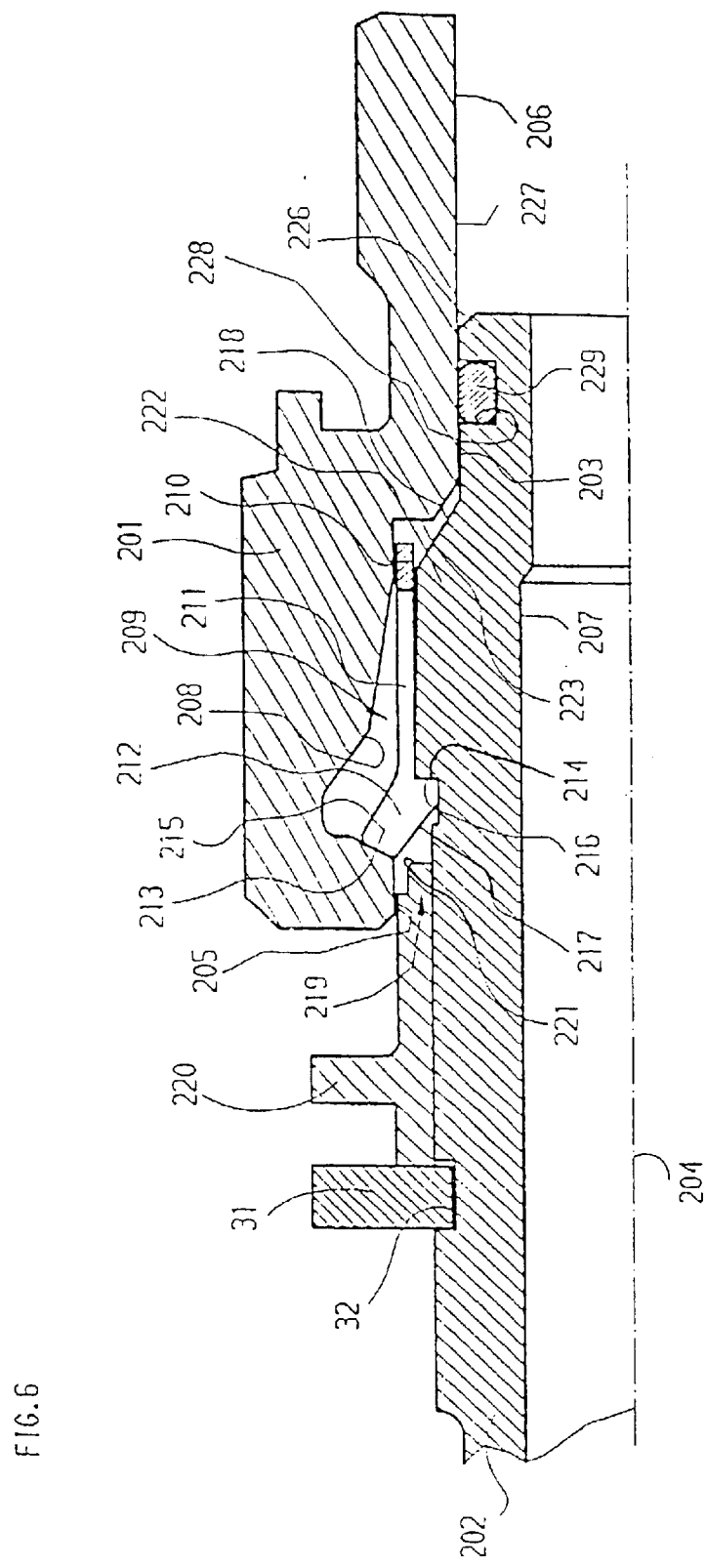
FIG. 6 is a longitudinal sectional view of a coupling where an unlocking sleeve is axially supported on a circlip.

FIG. 6 shows a coupling, which more or less corresponds to the coupling of FIGS. 3 and 4. Corresponding components are provided with reference numerals, which are increased by the value 100, and have been described in connection with the preceding Figures.

The unlocking sleeve 220 is axially supported by a circlip 31. The circlip 31 rests in a circumferential groove 32 in the second coupling element 202.

Figure 7:
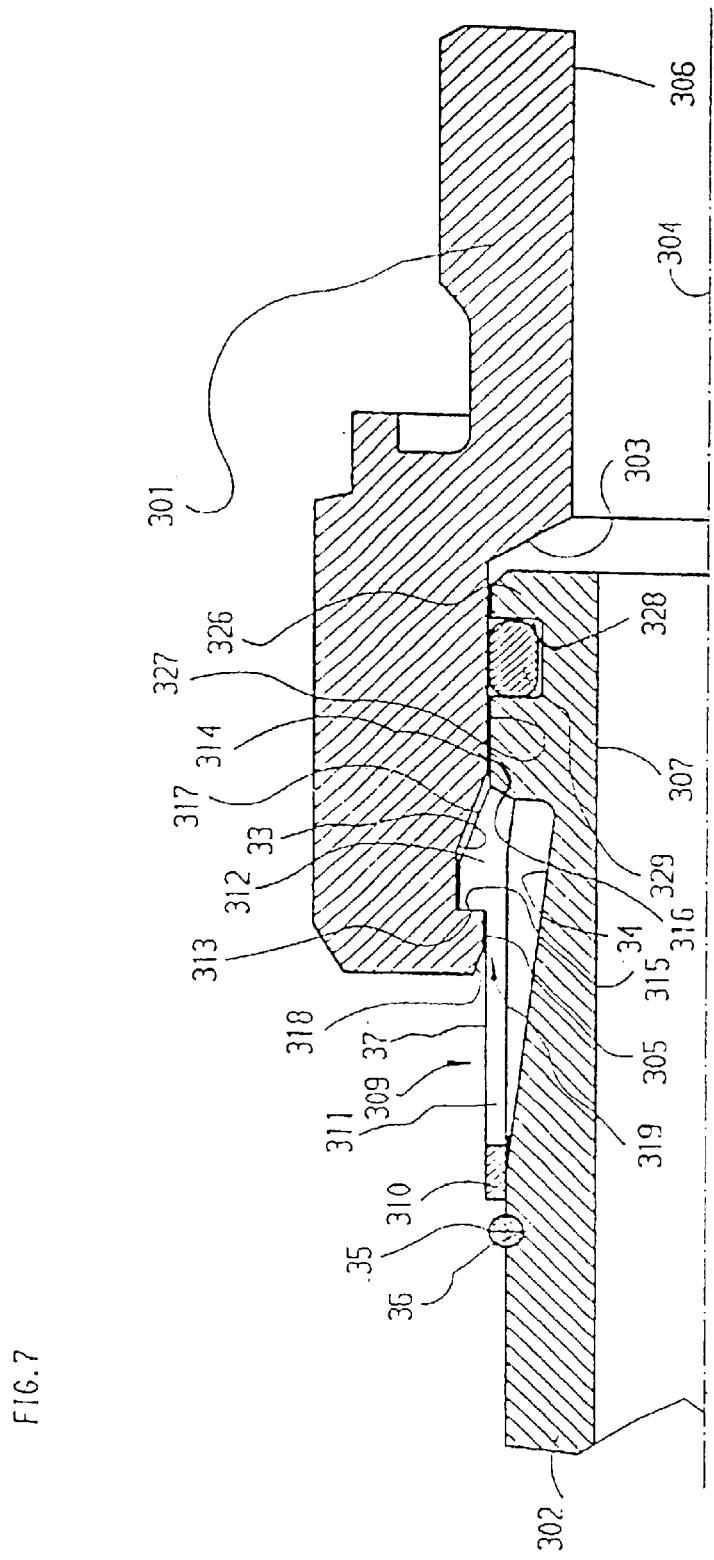
FIG. 7 is a longitudinal sectional view of an alternative embodiment of a coupling according to the invention with a holding element arranged around the second coupling element and spring elements are shown in a locking position.
Figure 8:
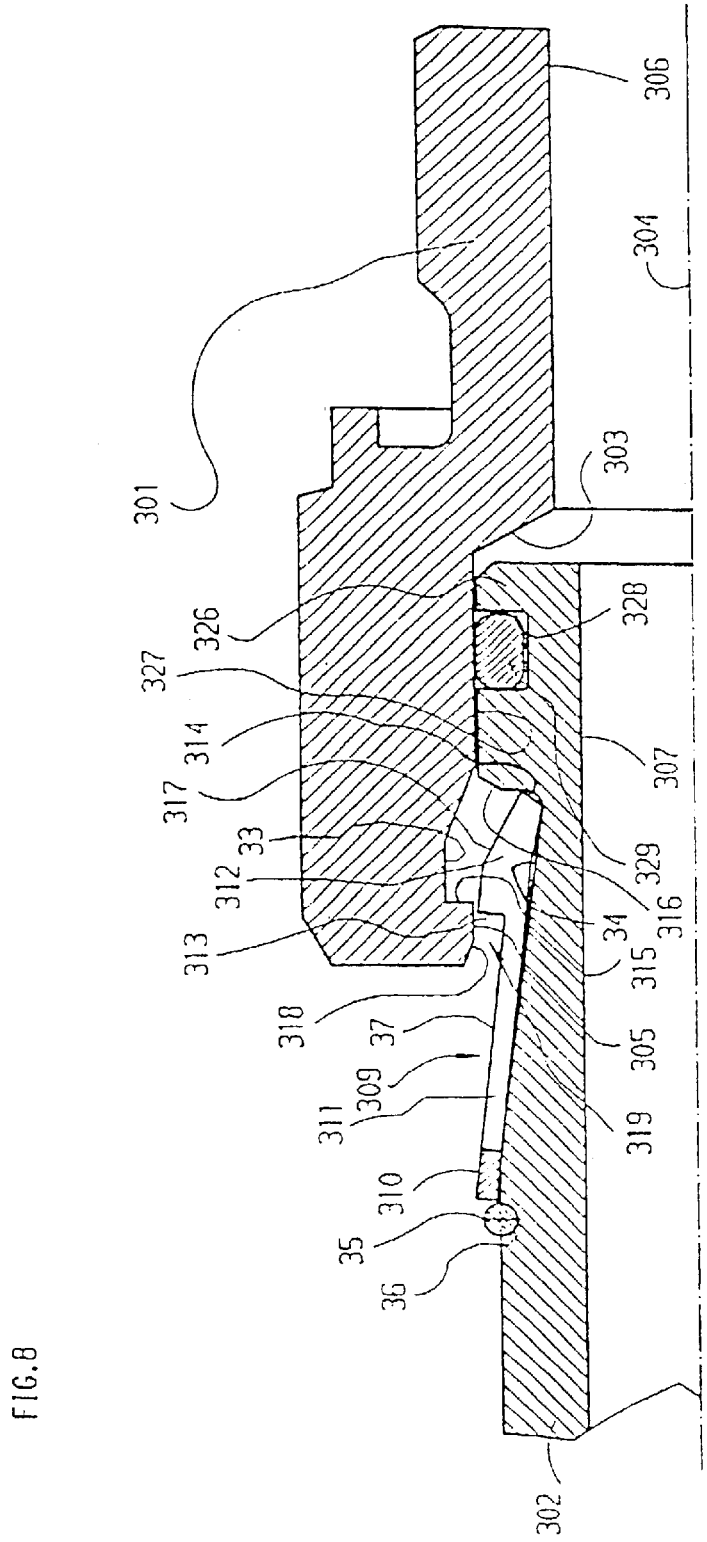
FIG. 8 is a longitudinal sectional view of the coupling of FIG. 7 with the spring elements in a second position.

FIGS. 7 and 8 show an alternative coupling for connecting hydraulic ducts. Components, which achieve the same function as the components in FIGS. 1 and 2, are provided with reference numerals, increased by the value 300 and are described therein.

In this embodiment, the holding element 309 is arranged on the second coupling element. The first coupling element 301 has an inner circumferential groove 33 which forms the first locking face 315. The second coupling element 302 has an outer circumferential groove 34. The locking elements 312, in the second position of the spring elements 311, can be moved radially inwardly into the groove 34. Further, the outer circumferential groove 34 forms the second locking face 316.

The first coupling element forms the first displacement face 318. During insertion of the second coupling element 302 into the receptacle 303, the first coupling element 301 interacts with the abutment face 317 of each locking element 312. Accordingly, the locking elements 312, together with the spring elements 311, are pushed radially inwardly into the releasing position.

The holding element 309 is arranged on the second coupling element 302. The spring elements 311 with their free ends that include the locking elements 312 project through an annular gap 319 between the first coupling element 301 and the second coupling element 302 into the receptacle 303. A part of the spring elements 311 can, therefore, be reached from the outside. The part of the spring element 311 can be compressed by a tool to release the coupling. The tool engages the outer faces 37 of the spring elements 311. The holding element 311 is axially supported with the ring 310 on a retaining ring 35. The retaining ring 35 rests in a circumferential groove 36 of the second coupling element 302.

Figure 9:
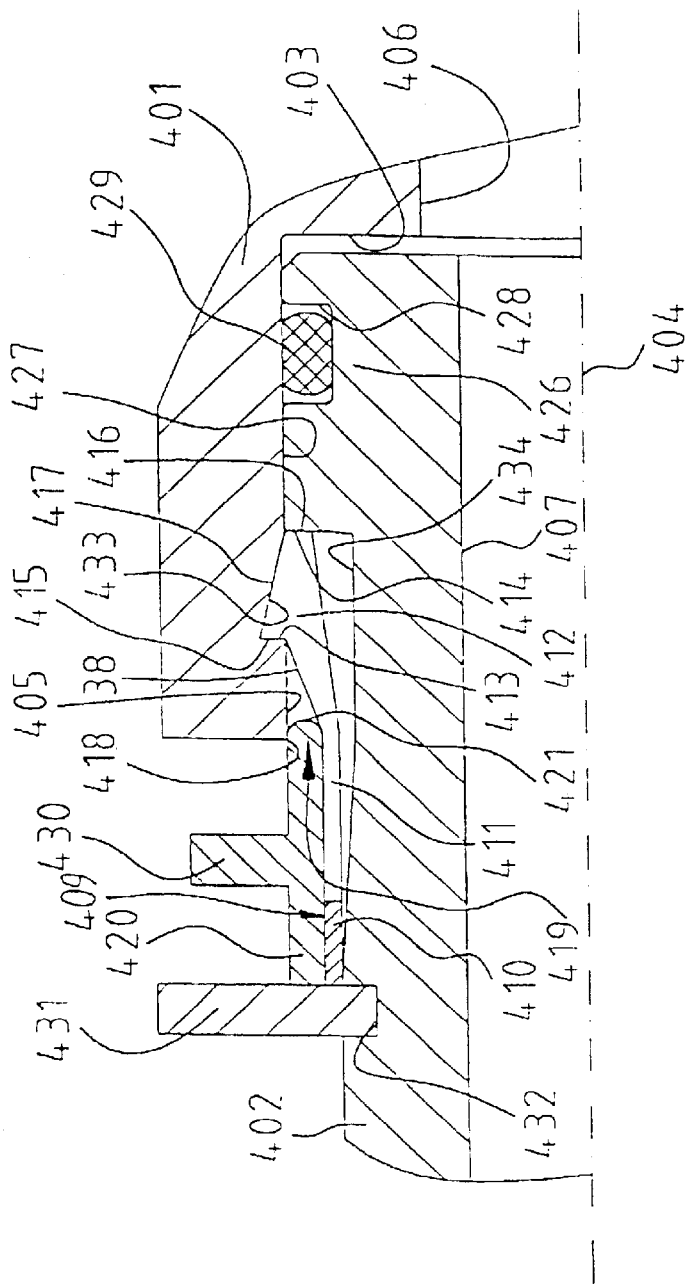
FIG. 9 is a longitudinal sectional view of a coupling with a holding element arranged on the second coupling element and the spring elements in a locking position.
Figure 10:
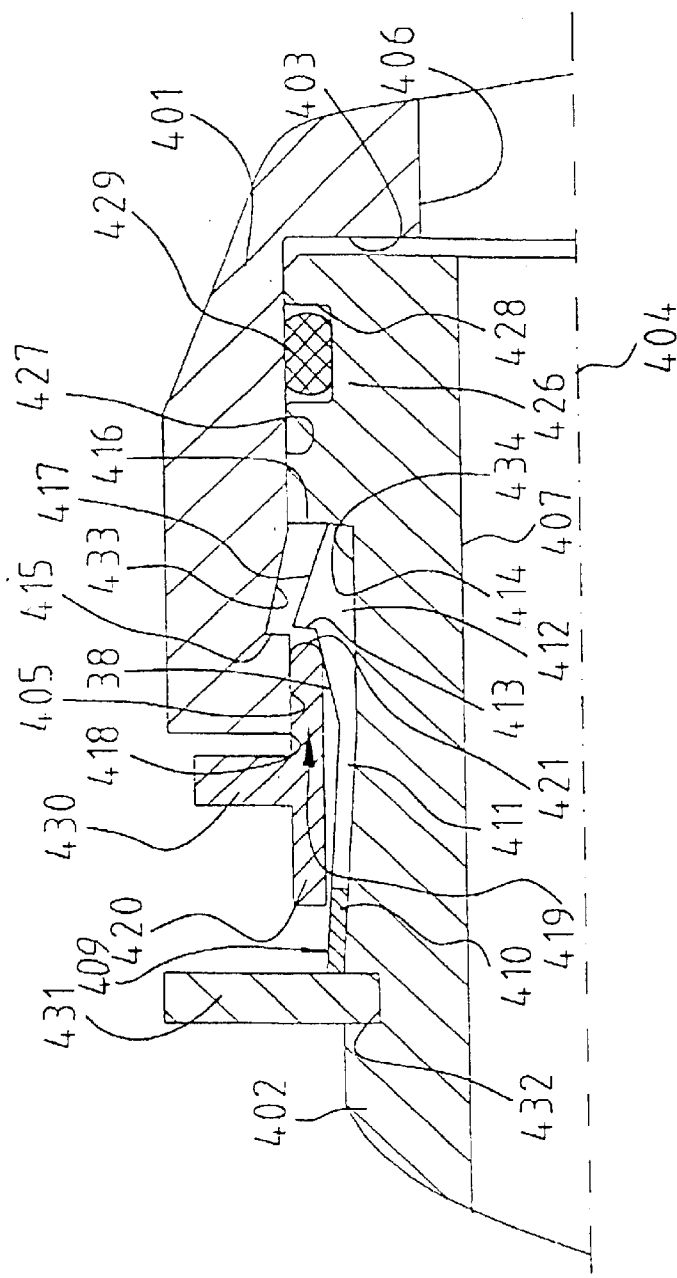
FIG. 10 is a longitudinal sectional view of a coupling of FIG. 9 with the spring elements shown in a releasing position.

A further embodiment of the coupling of FIGS. 7 and 8 is shown in FIGS. 9 and 10. Components achieving the same function like the components of FIGS. 7 and 8, are provided here with reference numerals, increased by the value 100 and described in FIGS. 7 and 8.

In this embodiment the holding element 409 is also arranged on the second coupling element 402. An unlocking sleeve 420 is axially displaceably arranged around the holding element 409. In the connected condition of the coupling when the second coupling element 402 is inserted into the receptacle 403 of the first coupling element 401, an annular gap 419 is formed between the holding element 409 and the second coupling element 402. The unlocking sleeve 420 passes through the gap 419 and projects from the receptacle 403. The unlocking sleeve 420 is axially displaceable between a locking position and a releasing position. By moving the unlocking sleeve 420 from the locking position into the releasing position the unlocking sleeve 420 interacts with a second abutment face 38 of the locking elements 412. Accordingly, the locking elements are moved from their locking position into their releasing position. In this case, the spring elements 411 are moved from the inner circumferential groove 433 into the outer circumferential groove 434.

Figure 11:
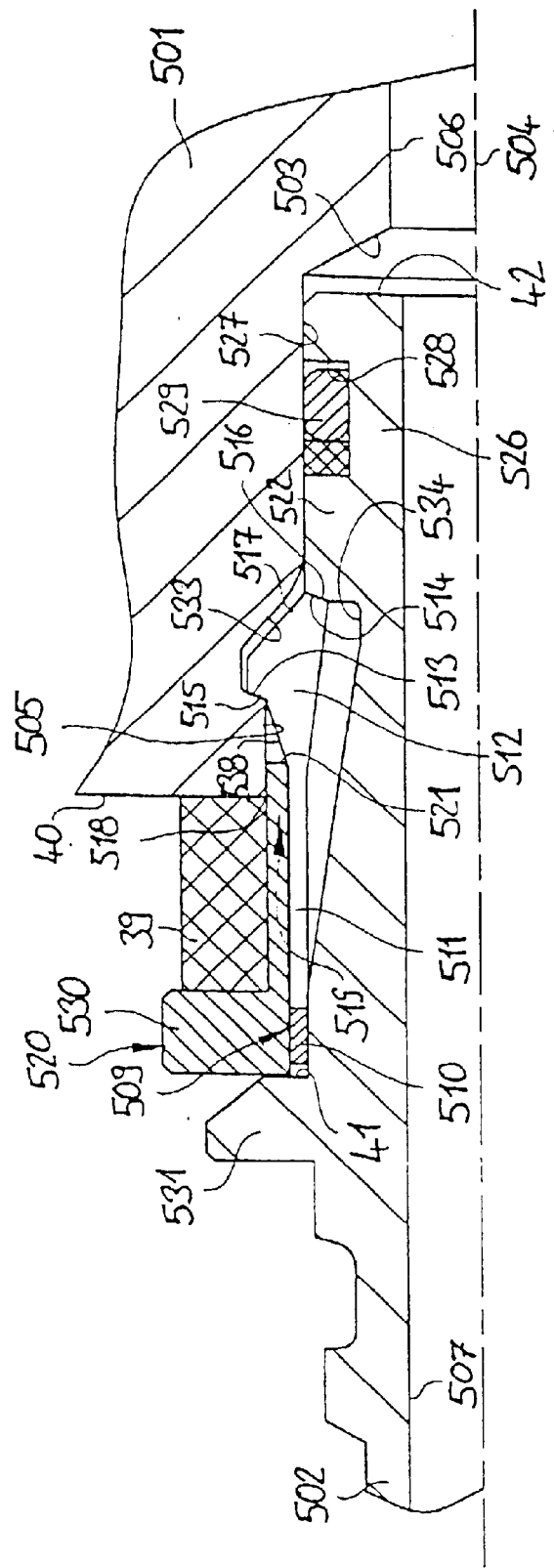
FIG. 11 is a longitudinal sectional view of a coupling of FIG. 9 with an elastic ring arranged between the flange portion of the unlocking sleeve and the first coupling element.
Figure 12:
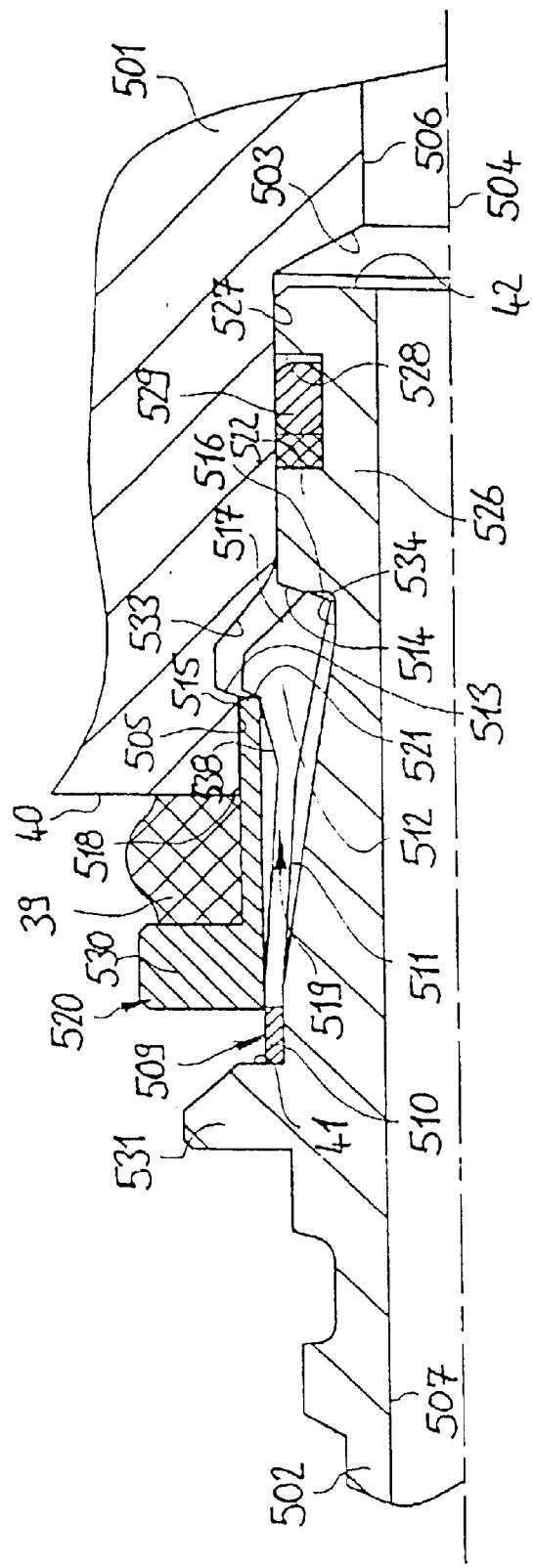
FIG. 12 is a longitudinal sectional view of the coupling of FIG. 11 with the spring elements shown in a releasing position.

FIGS. 11 and 12 show a similar embodiment of the coupling as shown in FIGS. 9 and 10. Corresponding components are provided with reference numerals, increased by the value 100.

The outer diameter of the centering portion 526 of the coupling element 502 is smaller than the inner diameter of the ring 510 of the holding element 509. Therefore, the holding element 509 and the unlocking sleeve 520 can be pre-assembled starting from the centering portion 526 on the second coupling element 502. In the pre-assembled condition, the holding element 509 is supported on a second shoulder 531 and on a second abutment face 514. The unlocking sleeve 520 is axially held between the second shoulder 531 and a second abutment face 538. Therefore, the holding element 509 as well as the unlocking sleeve 520 are held securely on the second coupling element 502 in the pre-assembled condition.

An elastic ring 39 is arranged around the unlocking sleeve 520. The elastic ring 39 is supported on a flange portion 530 and on an end face 40 of the first coupling element 501. The elastic ring 39 acts upon the unlocking sleeve 520 to take up its releasing position. Further, the elastic ring 30 serves as sealing element to prevent dirt from entering the coupling.

Figure 13:
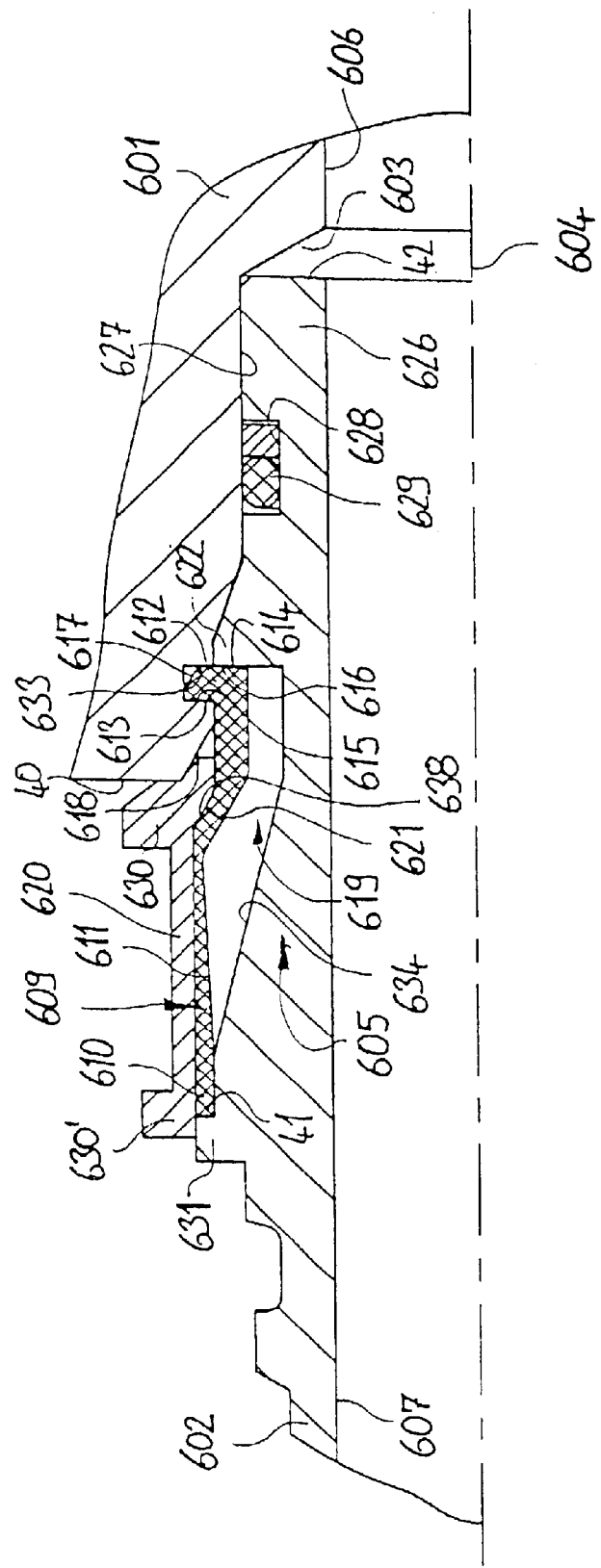
FIG. 13 is a longitudinal sectional view of a coupling according to the invention with the spring elements in a locking position.

FIG. 13 shows a coupling according to the invention for connecting hydraulic ducts with a first coupling element 601, in the form of a female coupling and a second coupling element 602, in the form of a male coupling. The first coupling element 601 has a receptacle 603. The second coupling element 602 is inserted in the direction of a longitudinal axis 604 through an opening 605 into the receptacle 603. The first coupling element 601 has a first axial bore 606 and the second coupling element 602 has a second axial bore 607. The axial bores 606 and 608, respectively, are connected to a hydraulic duct.

A holding element 609 is arranged on the second coupling element 602. The holding element 609 has a ring coaxially arranged along the longitudinal axis 604. Axially extending spring elements 611, which include free ends locking elements 612, extend from the ring 610.

The locking elements 612 have, respectively, a first abutment face 613 and a second abutment face 614. The abutment faces 613 and 614 are arranged facing away from one another. In the represented embodiment the first abutment face 613 and the second abutment face 614 are arranged parallel to each other and perpendicular to the longitudinal axis 604. In the locking position of the spring elements 611 shown in FIG. 13, the first abutment faces 613 of the locking elements 612 are supported on a first locking face 615. The first locking face 615 is formed by an inner circumferential groove 633. The first locking face 615 extends parallel to the first abutment faces 613. Further, the second abutment faces 614 are supported on a second locking face 616. The second locking face 616 is formed by an outer circumferential groove 634 of the second coupling element 602. The second locking face 616 extends parallel to the second abutment face 614. The first locking face 615 and the second locking face 616 face each other, so that in the connected condition shown in FIG. 13, the second coupling element 602 is secured against withdrawal from the receptacle 603.

Figure 14:
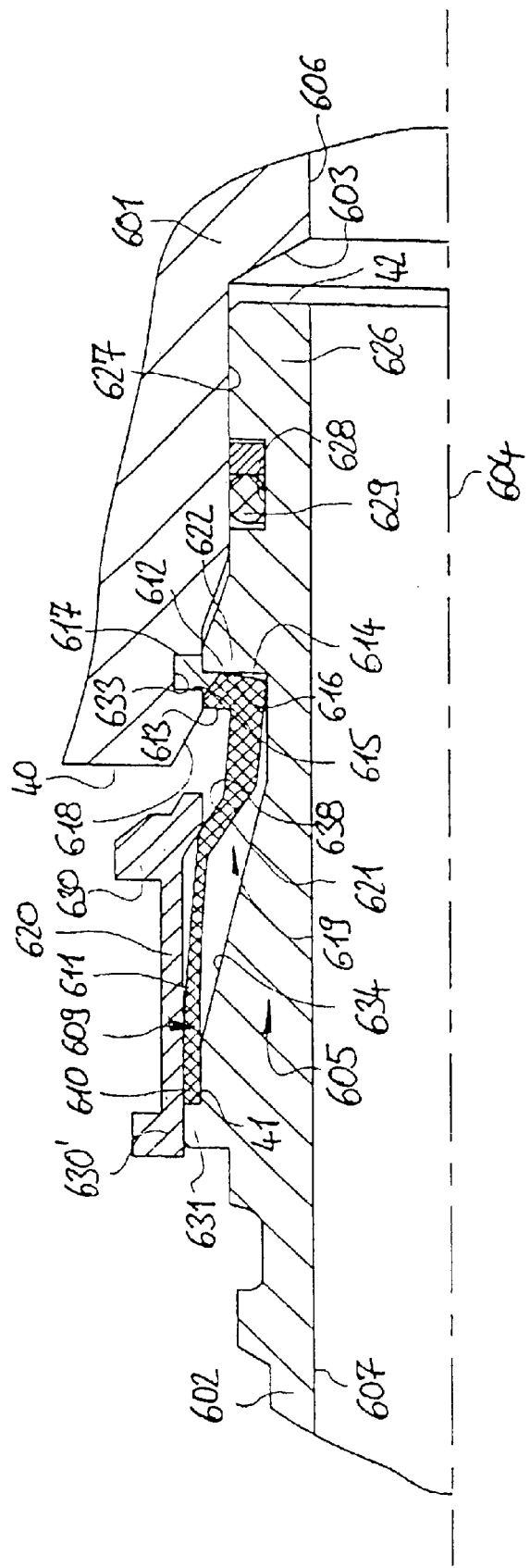
FIG. 14 is a longitudinal sectional view of the coupling of FIG. 13 with the spring elements in a releasing position.

The position of the coupling shown in FIG. 13 is achieved by axially inserting the second coupling element 602 into the receptacle 603 of the first coupling element 601 along the longitudinal axis 604 in an insertion direction. Thus, abutment faces 617 of the locking elements 612 slide on a displacement face 618 of the second coupling element 602. The displacement face 618 is formed in the area of the opening 612. During insertion, the locking elements 612 are moved radially inwardly from their locking position of FIG. 13 into their releasing position of FIG. 14. The spring elements 611 are, hereby, pushed deeper into the outer circumferential groove 634. As soon as the second coupling element 602 is moved far enough into the receptacle 603, the spring elements 611 move back into their locking position and simultaneously into the inner circumferential groove 633 and into engagement behind the first locking face 615.

The holding element 609 is arranged on the second coupling element 602. The spring elements 611, with their free ends, with the locking elements 612, project through an annular gap 619 between the first coupling element 601 and the second coupling element 602 into the receptacle 603. The holding element 609 is axially supported on the second locking face 616 and further on an abutment face 41. Therefore, the holding element 609 is securely arranged on the second coupling element 602.

To center the second coupling element 602 within the receptacle 603 the second coupling element 602, a cylindrical centering portion 626 is moved into a corresponding centering bore 627 of the receptacle 603. A circumferential groove 628 is provided in the centering portion 626. A sealing ring 629 rests in the groove 628. The sealing ring 629 is in sealing contact with the inner face of the centering bore 627.

An unlocking sleeve 620 is axially arranged around the holding element 609. The unlocking sleeve 620 is axially displaceable between a locking position and a releasing position. In the locking position the unlocking sleeve 620 is arranged with a smaller distance to the first coupling element 601 than in the releasing position. By means of moving the unlocking sleeve 620 from the locking position to the releasing position, i.e. against the insertion direction of the second coupling element 602, the unlocking sleeve interacts with the second abutment faces 638 of the locking elements 612. Thus, the locking elements 612 are moved from their locking position into their releasing position.

The unlocking sleeve 620 has an engaging tool mechanism in the form of a circumferentially extending flange portion 630. The flange portion 630 can be supported in a first alternative on the end face 40 of the first coupling element 601. In this case, the flange portion 630 is conically formed towards the first coupling element 601. Thus, one can push a tool formed fitting or a screw driver between the flange portion 630 and end face 40 of the first coupling element to displace the unlocking sleeve 620.

In a second alternative, the flange portion 630 can be distanced from the end face 40 of the first coupling element 601. Therefore, a sealing ring can be arranged around the unlocking sleeve corresponding to the coupling of FIGS. 11 and 12.

The second abutment faces 638 are arranged outside of the receptacle 603 in a direction away from the receptacle 603 with an increasing distance to the longitudinal axis 604. In this case, the unlocking sleeve 620 slides with a second displacement face 621 on the second abutment faces 638 of the spring elements 611.

The ring 610 has a larger inner diameter than the second coupling element 602 between the abutment face 41 and an end face 42 which is arranged on the free end of the second coupling element 602 inserted into the receptacle 603. Therefore, the holding element 609 can be pushed on starting from the end face 640. The inner diameter of the holding element 609 in the area of the locking elements 612 is smaller than the maximum outer diameter of the centering portion 626. Thus, the spring elements slide on the centering portion 626 and are bent towards the outside when assembling the holding element 609. After passing the centering portion 626, the spring elements 612 lock behind the second locking face 616. Accordingly, the holding element 609 is securely held between the abutment face 41 and the second locking face 616.

The unlocking sleeve 620 has an inner diameter which is larger than the outer diameter of the ring 610 of the holding element 609. Thus, the unlocking sleeve can be pushed over the holding element 609. Only in the area of the second displacement 621 does the unlocking sleeve 620 have a smaller diameter than the ring 610. Because of this, the axial path of the unlocking sleeve 620 is limited in a direction against the insertion direction in reference to the holding element 609. Further, the outer diameter of the holding element 612 is larger than the inner diameter of the unlocking sleeve 620 in the area of the second displacement face 621, when the spring elements 611 are in their locking position. Therefore, the unlocking sleeve 620 is axially securely fixed on the holding element 609.

The first abutment face and the second abutment face as well as the first locking face and the second locking face can be arranged at an angle towards each other. The first abutment face and the first locking face can be conically formed. The angle, which they enclose, is facing away from the opening. Compared to this, the second abutment face and the second locking face can be arranged perpendicular to the longitudinal axis. Thus, the distance between the first abutment face and the second abutment face and the distance between the first locking face and the second locking face is reduced radially from the inside to the outside. Thus, when the spring elements are moved into their releasing position, the second coupling has to be initially pushed axially deeper into the receptacle together with the holding element. Therefore, the coupling can only be released, when inner pressure is not present.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupling for connecting hydraulic ducts, comprising:
   a first coupling element being a female coupling, said first coupling element having a receptacle and forming a first locking face arranged around a longitudinal axis of the coupling;
   a second coupling element being a male coupling, said second coupling forming a second locking face arranged around the longitudinal axis, and said second coupling element insertable in the direction of the longitudinal axis through an opening into the receptacle of the first coupling element;
   a holding element having a ring, and several cantilever spring elements formed on the ring and said spring elements extending parallel to the longitudinal axis; and
   locking elements formed onto free ends of the spring elements;
   said spring elements being, respectively, elastically deformable against a spring force radially out of a locking position into a releasing position; and
   in a connected condition of the coupling elements the first locking face and the second locking face facing one another and the locking elements being supported in the locking position of the spring elements on one side by the first locking face and on another side by the second locking face.

2. The coupling according to claim 1, wherein the holding element rests in an annular recess of the receptacle of the first coupling element, said second coupling element forms a first displacement face arranged around the longitudinal axis, and when the second coupling element is inserted into the receptacle, the first displacement face interacts, respectively, with one abutment face of the locking elements such that the spring elements are movable from the locking position into the releasing position.

3. The coupling according to claim 2, wherein the second coupling element has a shoulder forming a second locking face as well as a first displacement face.

4. The coupling according to claim 2, wherein in its inserted condition, starting from the opening of the first coupling element, an annular gap between the first coupling element and the second coupling element is formed, an unlocking sleeve passes through said gap and projects from the receptacle, said unlocking sleeve being axially displaceable on the second coupling element between a locking position and a releasing position, said unlocking sleeve has a second displacement face interacting, respectively, with the abutment faces of the locking elements such that moving the unlocking sleeve from the locking position into the releasing position moves the spring elements into their releasing position.

5. The coupling according to claim 4, wherein said unlocking sleeve, in the releasing position, is supported on the second locking face and the outer diameter of the unlocking sleeve in the area of the transition between the unlocking sleeve and the shoulder is at least as large as the outer diameter of the shoulder.

6. The coupling according to claim 4, wherein said unlocking sleeve, in the locking position, is axially supported on a shoulder of the second coupling element or on a circlip, resting in a circumferential groove of the second coupling element.

7. The coupling according to claim 4, wherein said unlocking sleeve has engaging means for a tool.

8. The coupling according to claim 2, wherein an elastically deformable O-ring rests in the annular recess and said O-ring acting upon the spring elements for taking up their locking position.

9. The coupling according to claim 2, wherein the first locking face and the second locking face extend parallel to each other.

10. The coupling according to claim 2, wherein the first locking face is conically formed and opens facing away from the opening and the second locking face is arranged on a plane arranged at a right angle to the longitudinal axis.

11. The coupling according to claim 10, wherein the holding element is held axially displaceable in the annular recess and said second coupling element, in the connected state of the coupling elements, together with the holding element are axially displaceable between a first position, in which its locking elements abut the first locking face, and a second position, in which the ring of the holding element abuts a support face of the annular recess.

12. The coupling according to claim 1, wherein the holding element being arranged around the second coupling element, the first coupling element has an inner circumferential groove, forming the first locking face, said first coupling element in the area of the opening of the receptacle forming a first displacement face arranged around the longitudinal axis, and said second coupling element when inserted into the receptacle the first displacement face interacts, respectively, with an abutment face of the locking elements such that the spring elements are movable from the locking position into the releasing position.

13. The coupling according to claim 12, wherein in its inserted condition starting from the opening of the first coupling element, an annular gap is formed between the first coupling element and the second coupling element, the spring elements pass through said gap and project with their free ends into the receptacle.

14. The coupling according to claim 13, wherein the spring elements have engaging means for a tool for moving from the locking position into the releasing position.

15. The coupling according to claim 12, wherein the first locking face is arranged on a plane arranged at a right angle to the longitudinal axis and the second locking face is conically formed and opens facing away from the opening.

16. The coupling according to claim 12, wherein the holding element is axially displaceable held on the second coupling element and the second coupling element, in the inserted condition, together with the holding element is axially displaceable between a first position, in which the locking elements of the holding element abut the second locking face, and a second position, in which the ring of the holding element is axially displaceable to abut an abutment face.

17. The coupling according to claim 16, wherein the abutment face is formed by a retaining ring, resting in a circumferential groove of the second coupling element.

18. The coupling according to claim 12, wherein in its inserted condition starting from the opening of the first coupling element, an annular gap is formed between the holding element and the second coupling element, an unlocking sleeve passes through said gap and projects from the receptacle, said unlocking sleeve is axially displaceable on the second coupling element between a locking position and a releasing position, and said unlocking sleeve has a second displacement face, respectively, interacting with the second abutment faces of the locking elements such that moving the unlocking sleeve from the locking position into the releasing position the spring elements are movable into their releasing position.

19. The coupling according to claim 12, wherein an unlocking sleeve is axially displaceable arranged on the second coupling element and said unlocking sleeve being moved relative to the second coupling element against the insertion direction of the second coupling element into the receptacle, said unlocking sleeve being displaceable from a locking position into a releasing portion, and said unlocking sleeve has a second displacement face, respectively, interacting with second abutment faces of the locking elements such that moving the unlocking sleeve from the locking position into the releasing position moves the spring elements into their releasing position.

20. The coupling according to claim 19, wherein the second abutment faces being arranged in an axial direction opposite to the insertion direction with an increasing distance to the longitudinal axis.

21. The coupling according to claim 19, wherein the abutment faces in the inserted condition of the second coupling element being arranged outside the receptacle.

22. The coupling according to claim 19, wherein the second coupling element has a first shoulder forming the second locking face.

23. The coupling according to claim 22, wherein the holding element being supported in an axial direction on the second locking face and on an abutment face of the second coupling element.

24. The coupling according to claim 23, wherein the abutment face is formed by a second shoulder.

25. The coupling according to claim 19, wherein the inner diameter of the ring is larger than the maximum outer diameter of the second coupling element between the abutment face and an end face, said end face arranged on the end of the second coupling element which is the free end insertable into the receptacle.

26. The coupling according to claim 19, wherein the unlocking sleeve outside the area of the second displacement face having an inner diameter which is larger than the outer diameter of the ring.

* * * * *